(12) United States Patent
Kurauchi

(10) Patent No.: US 8,290,337 B2
(45) Date of Patent: Oct. 16, 2012

(54) REPRODUCTION APPARATUS, REPRODUCTION PROCESSING CIRCUIT, REPRODUCTION METHOD, REPRODUCTION PROGRAM, AND COMPUTER-READABLE RECORD MEDIUM WITH REPRODUCTION PROGRAM

(75) Inventor: Nobukazu Kurauchi, Aichi (JP)

(73) Assignee: Panasonic Corporation, Osaka (JP)

( * ) Notice: Subject to any disclaimer, the term of this patent is extended or adjusted under 35 U.S.C. 154(b) by 844 days.

(21) Appl. No.: 10/585,689

(22) PCT Filed: May 24, 2005

(86) PCT No.: PCT/JP2005/009416
§ 371 (c)(1),
(2), (4) Date: Jul. 10, 2006

(87) PCT Pub. No.: WO2005/119676
PCT Pub. Date: Dec. 15, 2005

(65) Prior Publication Data
US 2008/0285953 A1    Nov. 20, 2008

(30) Foreign Application Priority Data
Jun. 1, 2004  (JP) .................................. 2004-162878

(51) Int. Cl.
*H04N 9/80* (2006.01)
*H04N 5/917* (2006.01)

(52) U.S. Cl. ........................................ 386/239; 386/353

(58) Field of Classification Search ............... 386/66, 386/69, 72, 75, 83, 109, 326–341, 353–357, 386/239–248
See application file for complete search history.

(56) References Cited

U.S. PATENT DOCUMENTS
5,345,433 A * 9/1994 Ohga et al. ................. 369/47.29
(Continued)

FOREIGN PATENT DOCUMENTS
EP       1 087 392 A2    3/2001
(Continued)

OTHER PUBLICATIONS
Supplementary European Search Report issued Nov. 8, 2011 in corresponding European Application No. 05 74 3312.
(Continued)

*Primary Examiner* — Thai Tran
*Assistant Examiner* — Hung Dang
(74) *Attorney, Agent, or Firm* — Wenderoth, Lind & Ponack, L.L.P.

(57) ABSTRACT

A reproduction apparatus is provided which is capable of reproducing audio data continuously and unbrokenly, without increasing the storage capacity of a storing means.

An optical pick-up 101 reads audio information from an optical-disk medium 120 and reads, from the optical-disk medium 120, image information recorded in a position different from the audio information; a first audio compression section 104 lowers the capacity of the read audio information; a first audio storage section 105 stores the audio information whose capacity has been lowered; an audio output section 111 reproduces the stored audio information; a first image storage section 114 stores the read image information; an image output section 118 reproduces the stored image information; the audio information includes first audio information and second audio information which is continuously reproduced after the first audio information; and the first audio compression section 104 lowers the capacity of the first audio information, so that the reading of the second audio information is completed before the reproduction of the first audio information is completed, for the period of time when the image information is reproduced.

15 Claims, 6 Drawing Sheets

U.S. PATENT DOCUMENTS

| | | | |
|---|---|---|---|
| 5,951,646 A | 9/1999 | Brandon | |
| 6,065,094 A | 5/2000 | Akiyama | |
| 6,205,097 B1 * | 3/2001 | Dark et al. | 369/53.15 |
| 6,324,188 B1 * | 11/2001 | Tsuji | 370/537 |
| 2002/0001457 A1 * | 1/2002 | Iwasaki et al. | 386/104 |
| 2002/0126860 A1 * | 9/2002 | Staley | 381/106 |
| 2002/0166439 A1 * | 11/2002 | Nishitani et al. | 84/600 |
| 2002/0176327 A1 * | 11/2002 | Yamada et al. | 369/30.26 |
| 2004/0156294 A1 | 8/2004 | Watanabe et al. | |
| 2005/0031302 A1 * | 2/2005 | Sako et al. | 386/68 |

FOREIGN PATENT DOCUMENTS

| | | | |
|---|---|---|---|
| JP | 58-60412 | | 4/1983 |
| JP | 5-128727 | | 5/1993 |
| JP | 6-28773 | | 2/1994 |
| JP | 10-97764 | | 4/1998 |
| JP | 11-52995 | | 2/1999 |
| JP | 11-238318 | | 8/1999 |
| JP | 2000-4423 | | 1/2000 |
| JP | P2001-92450 A | * | 4/2001 |
| JP | 2001-507471 | | 6/2001 |
| JP | 2004-140418 | | 5/2004 |
| JP | 2005-63627 | | 3/2005 |
| WO | 02/086873 | | 10/2002 |

OTHER PUBLICATIONS

Japanese Office Action issued Mar. 9, 2010 in corresponding Japanese Patent Application No. 2006-514073, and corresponding English language translation.

* cited by examiner

REPRODUCTION APPARATUS, REPRODUCTION PROCESSING CIRCUIT, REPRODUCTION METHOD, REPRODUCTION PROGRAM, AND COMPUTER-READABLE RECORD MEDIUM WITH REPRODUCTION PROGRAM

TECHNICAL FIELD

The present invention is an optical disk apparatus, typically, such as a DVD and a CD-ROM, or other than this, a reproduction apparatus which reproduces audio information or another kind of information, for example, image information or video information, which is recorded using an electrical or magnetic phenomenon. It relates to a reproduction apparatus, a reproduction processing circuit, a reproduction method, a reproduction program, and a computer-readable record medium where a reproduction program is recorded, which are capable of preventing a concurrent reproduction from being interfered with because of a constraint on a head's seek time or the like, or a simultaneous reproduction from being affected because the seek time becomes longer by executing a retry after a seek error or the like, in the case where the part where image information is recorded is separated from the part where audio information is recorded.

BACKGROUND ART

A conventional reproduction apparatus which is capable of reading and reproducing audio information and image information concurrently from a record medium where the audio information and the image information are recorded, is described, for example, in the following Patent Document 1 or Patent Document 2.

FIG. 3 is a block diagram, showing the configuration of the main part of a conventional optical-disk simultaneous reproduction apparatus 900. In an optical-disk medium 901, audio data and image data are recorded, and such data is read by an optical pick-up 915.

The optical pick-up 915 is attached, for example, to an optical head (not shown) which executes a scan on the optical-disk medium 901. In order to read necessary audio data and image data, it moves, together with the optical head, on the optical-disk medium 901.

In terms of the audio data and the image data read by the optical pick-up 915, an audio-and-image decision section 902 distinguishes between the audio data and the image data. The audio data distinguished by the audio-and-image decision section 902 is switched by an audio switch section 903. Then, it is alternately stored in an audio storage section 904 and an audio storage section 905. On the other hand, the image data distinguished by the audio-and-image decision section 902 is switched by an image switch section 908. Then, it is alternately sent to an image expansion section 909 and an image expansion section 912.

In the image expansion section 909 or the image expansion section 912, for example, the image data compressed in a compression format such as a JPEG is restored to the initial image data which can be displayed. Then, it is stored in an image storage section 910 or an image storage section 913.

The audio data stored in the audio storage section 904 or the audio storage section 905 is alternately switched by an audio switch section 906. Then, it is alternately outputted, respectively, by an audio output section 907. When the audio data is stored in the audio storage section 904 by the switch of the audio switch section 903, the audio data already stored in the audio storage section 905 by the switch of the audio switch section 906 is outputted from the audio output section 907.

In contrast, when the audio data is stored in the audio storage section 905 by the switch of the audio switch section 903, the audio data already stored in the audio storage section 904 by the switch of the audio switch section 906 is outputted from the audio output section 907. Through such a switch, the audio data is continuously outputted without a break from the audio output section 907.

Similarly, the image data stored in the image storage section 910 or the image storage section 913 is alternately switched by an image switch section 911. Then, it is alternately outputted, respectively, by an image output section 914. When the image data is stored in the image storage section 910 by the switch of the image switch section 908, the image data already stored in the image storage section 913 by the switch of the image switch section 911 is outputted from the image output section 914.

In contrast, when the image data is stored in the image storage section 913 by the switch of the image switch section 908, the image data already stored in the image storage section 910 by the switch of the image switch section 911 is outputted from the image output section 914. Through such a switch, the image data is also continuously outputted without a break from the image output section 914.

These image data and audio data are, for example, static-image contents and audio contents that explain these image contents which are recorded in the single optical-disk medium 901. Hence, they need to be concurrently reproduced so as to synchronize in exact timing. This requires that both the image data and the audio data be continuously reproduced without a break.

FIG. 4 is a timing chart, showing the reproduction at the normal time of the above described conventional optical-disk simultaneous reproduction apparatus 900.

The optical pick-up 915 seeks for reading audio data. In FIG. 4, this period of time is denoted by "T921". After this, without specific notice, the period when each operation is executed is designated by "T" and the following numeral. This "T" and the following three-digit number indicates the period when each operation is executed and the period's length at the same time.

Next, the optical pick-up 915 moves to a required place on the optical-disk medium 901 in the seek (T921). Then, it reads the audio data (T922). At this time, the audio data read from the optical-disk medium 901 is simultaneously stored through the audio switch section 903 in the audio storage section 904 (T922).

The audio data stored in the audio storage section 904 is outputted via the audio switch section 906 from the audio output section 907 (T951). In the above described serial processing, the audio contents recorded in the optical-disk medium 901 are reproduced.

Sequentially, the optical pick-up 915 seeks to a necessary position for reading image data from the optical-disk medium 901 (T923). Next, the optical pick-up 915 moves to a required place on the optical-disk medium 901 in a seek (T923). Then, it reads the image data (T924). This time is also the period (T924) for which the read image data is simultaneously written through the image switch section 908 in the image expansion section 909.

In the image expansion section 909, the written image data is expanded (T929). Then, the expanded image data is stored in the image storage section 910. Herein, as described above, the expansion of image data means, for example, that the image data compressed in such a format as a JPEG is restored to the initial image data which can be displayed. The image data stored in the image storage section 910 is outputted via the image switch section 911 from the image output section 914 (T952). In the above described serial processing, the image contents recorded in the optical-disk medium 901 are reproduced.

After finishing reading the image data (T924), the optical pick-up 915 seeks to the position on the optical-disk medium 901 which is necessary for reading the next audio data (T925). Through this seek, the optical pick-up 915 moves to the position on the optical-disk medium 901 which is necessary for reading the next audio data. Then, it reads the next audio data from this optical-disk medium 901 (T926).

At this time, the audio data read from the optical-disk medium 901 is simultaneously stored via the audio switch section 903, this time, in the audio storage section 905 different from the preceding one (T926). In this way, the preparation is completed for outputting the audio data stored in the audio storage section 905 from the audio output section 907.

At this time, the reproduction of the preceding audio data stored in the audio storage section 904 is not yet completed. This produces a certain spare time (T941). After this spare time (T941) has elapsed, the audio data stored in the audio storage section 905 is outputted via the audio switch section 906 from the audio output section 907 (T953). This state is expressed by the following formula (1).

$$T951-(T923+T924+T925+T926)=T941>0 \quad (1)$$

The seek time (T923) for reading image data, the period (T924) for reading the image data, the seek period (T925) for reading the next audio data and the period (T926) for reading the next audio data are summed up. This total period is the period of time required from the time when the audio data stored in the audio storage section 904 is read to the time when the next audio data stored in the audio storage section 905 is read.

The period of time required from the time when the audio data stored in the audio storage section 904 is read to the time when the next audio data stored in the audio storage section 905 is read is subtracted from the period (T951) for reproducing the audio data stored in the audio storage section 904. This period is the spare time (T941). As long as this value is plus, the audio data can be normally reproduced continuously and without a break.

After the next audio data stored in the audio storage section 905 has been read (T926), the optical pick-up 915 seeks for reading the next image data (T927). Then, the optical pick-up 915 seeks to a necessary position for reading the next image data. Sequentially, it reads the next image data from the optical-disk medium 901 (T928).

The image data read from the optical-disk medium 901 by the optical pick-up 915 is written, this time, in the image expansion section 912 different from the preceding one, by the switching of the image switch section 908 (T928). The image data written in the image expansion section 912 is expanded in the image expansion section 912. Then, it is restored to the initial data format which can be displayed and is stored in the image storage section 913 (T930). In this way, the preparation is completed for outputting it from the image output section 914.

However, at this time, the reproduction of the preceding image data stored in the image storage section 910 is not yet completed (T952). Hence, also in terms of the image data's reproduction, a spare time (T942) is produced. After the reproduction of the preceding image data stored in the image storage section 910 has been completed (T952), the next image data stored in the image storage section 913 starts to be reproduced (T954).

As described so far, in terms of the storage sections for audio of the audio storage section 904 and the audio storage section 905 and the storage sections for images of the image storage section 910 and the image storage section 913, two sets are prepared, respectively. Then, switching is executed to each of them and is repeatedly used alternately. In addition, the audio data and the image data can be concurrently reproduced continuously and without a break, as long as each period when audio data and image data are written and read always has a spare period.

In this conventional optical-disk simultaneous reproduction apparatus 900, image data and audio data are reproduced in the following way. They are read, not concurrently in reality, but alternately from a different position on the optical-disk medium 901 by the optical pick-up 915.

In other words, the storage of audio data in the audio storage section 904 and the audio storage section 905 for audio-data storage, and the storage of image data in the image storage section 910 and the image storage section 913 for image-data storage, are alternately used. Thereby, it looks as if the audio data and the image data were concurrently read. This makes it possible to reproduce the audio data and the image data simultaneously and in parallel.

However, as can be seen from the above explanation, this processing can be executed only on the precondition that the spare time (T941) and the spare time (T942) can be secured. For example, the positions on the optical-disk medium 901 in which audio data and image data to be concurrently read are recorded may be away from each other, like the fact that one is located at its outer circumferential part and the other is located at the inner circumferential part. Or, even if they are not separate so far, when a seek error is made because of some cause or other and a seek retry is executed, the time taken for such a seek may be longer. In these cases, the above described spare time cannot be secured.

FIG. 5 and FIG. 6 show an example of this state. FIG. 5 is an illustration, showing the position in which audio data is recorded and the position in which image data is recorded in an optical-disk medium. As shown in FIG. 5, audio data is recorded in an inner circumferential part 901a of a record area (i.e., a hatched area of FIG. 5) of the optical-disk medium 901 and image data is recorded in an outer circumferential part 901b. This lengthens the seek time (T923 of FIG. 4) when the optical pick-up 915 moves from the recording position of audio data to the recording position of image data and the seek time (T925 of FIG. 4) when the optical pick-up 915 moves from the recording position of image data to the recording position of audio data. Hence, the spare time (T941 of FIG. 4) may not be secured.

FIG. 6 is a timing chart, showing the reproduction at an abnormal time of the above described conventional optical-disk simultaneous reproduction apparatus 900. The reproduction timing chart at an abnormal time in the conventional optical-disk simultaneous reproduction apparatus 900 shown in FIG. 6 is different from the reproduction timing chart at the normal time in the conventional optical-disk simultaneous reproduction apparatus 900 shown in FIG. 4, only in the following point. It is the seek time (T925) for the next audio-data reading which follows the image-data reading (T924).

In the reproduction timing chart at an abnormal time in the conventional optical-disk simultaneous reproduction apparatus 900 shown in FIG. 6, the next seek time (T925) for reading the audio data is longer. Thus, before the next audio-data reading is completed (T926), the preceding audio-data reproduction period (T951) comes to an end. This produces a period of time (T943) for which the audio data is broken. This state is expressed by the following formula (2).

$$T951-(T923+T924+T925+T926)=-T943<0 \qquad (2)$$

The seek time (T923) for reading image data, the period (T924) for reading the image data, the next seek period (T925) for reading the audio data and the period (T926) for reading the next audio data are summed up. This total period is the period of time required from the time when the audio data stored in the audio storage section 904 is read to the time when the next audio data stored in the audio storage section 905 is read.

The period of time required from the time when the audio data stored in the audio storage section 904 is read to the time when the next audio data stored in the audio storage section 905 is read is subtracted from the period (T951) for reproducing the audio data stored in the audio storage section 904. This period is the spare time (T943). At this time when the abnormality takes place, the seek period (T925) is too long, thus making this value minus.

As a result, the audio data cannot be reproduced continuously and without a break. This produces the period of time (T943) for which the audio data is broken. As one of the measures to evade this situation, it can be considered that the storage capacity is increased of the audio storage section 904 and the audio storage section 905 for audio-data storage and the image storage section 910 and the image storage section 913 for image-data storage.

However, a storage capacity always needs to be secured in advance which is large enough to guarantee that audio data is certainly concurrently reproduced with its audio unbroken. In order to do this, a storing means with a great capacity which is not used in an ordinary condition always has to be prepared for an abnormal occasion. It is unclear when such an abnormal occasion will occur, and thus, this measure is extremely inefficient.

Patent Document 1: Japanese Patent Laid-Open No. 11-238318 specification

Patent Document 2: published Japanese translation of PCT international publication for patent applications No. 2001-507471 specification

DISCLOSURE OF THE INVENTION

In order to resolve the above described disadvantages, it is an object of the present invention to provide a reproduction apparatus, a reproduction processing circuit, a reproduction method, a reproduction program, and a computer-readable record medium where a reproduction program is recorded, which are capable of reproducing audio data continuously and unbrokenly, without increasing the storage capacity of a storing means.

A reproduction apparatus according to the present invention which reads and reproduces audio information and another kind of information from a record medium where the audio information and another kind of information are recorded, characterized in that: the reproduction apparatus includes a reading means for reading the audio information from the record medium, and reading, from the record medium, another kind of information recorded in a different position from the position of the audio information, a capacity-lowering means for lowering the capacity of the audio information read by the reading means, an audio storing means for storing the audio information whose capacity is lowered by the capacity-lowering means, an audio reproducing means for reproducing the audio information stored in the audio storing means, an another-kind-of-information storing means for storing another kind of information read by the reading means, and an another-kind-of-information reproducing means for reproducing another kind of information stored in the another-kind-of-information storing means; the audio information includes first audio information, and second audio information which is continuously reproduced after the first audio information; and the capacity-lowering means lowers the capacity of the first audio information read by the reading means, so that the reading of the second audio information is completed before the reproduction of the first audio information is completed, for the period of time when another kind of information is reproduced by the another-kind-of-information reproducing means.

According to this configuration, audio information is read from a record medium, another kind of information recorded in a different position from the position of the audio information is read from the record medium, and the capacity of the read audio information is lowered. Then, the audio information whose capacity has been lowered is stored, and the stored audio information is reproduced. Further, another kind of information which has been read is stored, and another kind of information which has been stored is reproduced. The audio information includes first audio information and second audio information which is continuously reproduced after the first audio information. The second audio information is continuously reproduced after the reproduction of the first audio information has been completed. Then, the capacity of the first audio information is lowered, so that the reading of the second audio information is completed before the reproduction of the first audio information is completed, for the period of time when another kind of information is reproduced.

Accordingly, the capacity of the first audio information is lowered and stored, so that the reading of the second audio information is completed before the reproduction of the first audio information is completed. Therefore, the time for reproducing the audio information can be extended without increasing the storage capacity of a storing means. Hence, even if a certain time is taken to read the next audio information or another kind of information, a plurality of pieces of audio information can be reproduced continuously and unbrokenly.

According to the present invention, audio information and another kind of information are read from a record medium in which the audio information and another kind of information are stored. Then, the capacity of the read audio information is lowered, and it is temporarily stored in an audio storing means. Therefore, a large quantity of audio information can be stored, as if the storage capacity of the audio storing means had been substantially greater. Even if a long time is taken to read the audio because of some cause or other, the omission of the audio information or the like can be prevented from producing a silent state. This helps reproduce the audio contents continuously and synchronously with another kind of information.

The objects, characteristics and advantages of the present invention will be more obvious in the following detailed description and attached drawings.

BEST MODE FOR IMPLEMENTING THE INVENTION

Hereinafter, a reproduction apparatus according to an embodiment of the present invention will be described with reference to the attached drawings.

Figure 1:
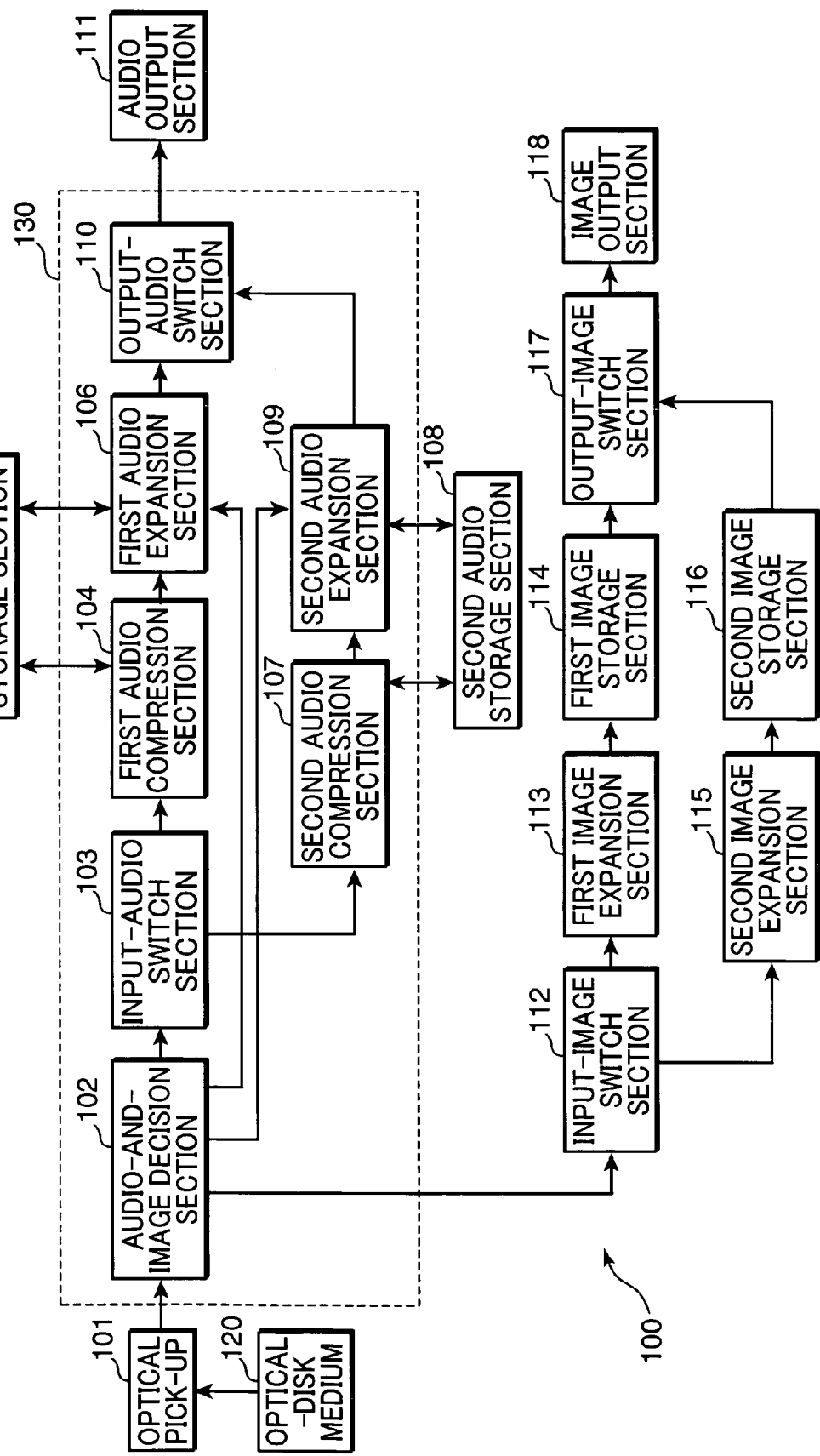
FIG. 1 is a block diagram, showing the configuration of the main part of an optical-disk simultaneous reproduction apparatus according to an embodiment of the present invention.

FIG. 1 is a block diagram, showing the configuration of the main part of the optical-disk simultaneous reproduction apparatus according to the embodiment of the present invention. An optical-disk simultaneous reproduction apparatus 100 shown in FIG. 1 can compress audio data read from an optical-disk medium 120 and store it in a first audio storage section 105 and a second audio storage section 108.

In this embodiment, the optical-disk simultaneous reproduction apparatus 100 is described as an example of the reproduction apparatus. However, the reproduction apparatus according to the present invention is not limited to the optical-disk simultaneous reproduction apparatus 100. Any equipment may be applied, as long as information can be recorded and/or reproduced using optical, magnetic, electrical, physical, chemical and other various phenomena and a combination of some of these phenomena, such as a DVD reproduction apparatus, a DVD recording reproduction apparatus, a CD-R/ROM reproduction apparatus, an HDD and an MO.

The optical-disk simultaneous reproduction apparatus 100 shown in FIG. 1 is configured by: an optical pick-up 101; an audio-and-image decision section 102; an input-audio switch section 103; a first audio compression section 104; a first audio storage section 105; a first audio expansion section 106; a second audio compression section 107; a second audio storage section 108; a second audio expansion section 109; an output-audio switch section 110; an audio output section 111; an input-image switch section 112; a first image expansion section 113; a first image storage section 114; a second image expansion section 115; a second image storage section 116; an output-image switch section 117; and an image output section 118.

A reproduction processing circuit 130 shown by a broken line in FIG. 1 is formed by: the audio-and-image decision section 102; the input-audio switch section 103; the first audio compression section 104; the first audio expansion section 106; the second audio compression section 107; the second audio expansion section 109; and the output-audio switch section 110.

In an optical-disk medium 120, audio information (hereinafter, also referred to as audio data) and image information (hereinafter, also referred to as image data) are recorded in advance. Incidentally, in this embodiment, audio information and image information are illustrated as the information recorded in this optical-disk medium 120. However, the present invention is not limited especially to this. The information recorded in the optical-disk medium 120 may also be any information except these, for example, another piece of audio information, video information, text information, or any information other than these.

The optical-disk medium 120 is a disk-shaped rotary record medium in which information is recorded and/or reproduced, as described above, using optical, magnetic, electrical, physical, chemical and other various phenomena and a combination of some of these phenomena. However, the record medium where audio information and image information are recorded according to the present invention is not necessarily limited to this one. In other words, any media may also be used as the optical-disk medium 120, as long as information can be recorded and/or reproduced using such various phenomena as described above and a certain time can be taken for its reproduction. Herein, the optical-disk medium 120 is rotated by a rotating means such as a spindle motor (not shown).

The optical pick-up 101 reads audio information and image information from the optical-disk medium 120. The optical pick-up 101 is mounted in an optical head for reading the audio information and the image information stored in this optical-disk medium 120. It scans on the optical-disk medium 120 and moves to a position in which necessary data is stored to read the data.

Incidentally, the optical pick-up 101 is used as an example of the reading means for reading audio information and image information from a record medium according to the present invention. However, it is not necessarily limited to this optical pick-up 101. Anything may also be used, as long as it can read recorded information using the above described various phenomena and take a certain time to read it.

In the optical-disk simultaneous reproduction apparatus 100 shown in FIG. 1, the audio information and the image information stored in this optical-disk medium 120 are read by the optical pick-up 101. The audio-and-image decision section 102 decides which the data read by the optical pick-up 101 is, audio data or image data. Besides, the audio-and-image decision section 102 outputs parameter information necessary for the extrapolation of the audio data compressed by the first audio compression section 104 and the second audio compression section 107 to the first audio expansion section 106 and the second audio expansion section 109.

The audio data distinguished by the audio-and-image decision section 102 is switched by the input-audio switch section 103. Then, it is alternately inputted in the first audio compression section 104 and the second audio compression section 107. If the audio data is stored in the second audio storage section 108 or if the audio data is not stored in either of the first audio storage section 105 and the second audio storage section 108, the input-audio switch section 103 outputs the audio data to the first audio compression section 104. If the audio data is stored in the first audio storage section 105, it outputs the audio data to the second audio compression section 107.

In the first audio compression section 104 and the second audio compression section 107, the compression necessary for the inputted audio data is executed, in other words, the audio data's capacity is lowered. In order to lower the audio data's capacity, various methods can be used.

Hereinafter, audio-data capacity-lowering methods will be specifically described. In one of the audio-data capacity-lowering methods, when audio data is subjected to a pulse-code modulation, its sampling frequency is lowered. In the concrete, the first audio compression section 104 and the second audio compression section 107 lower the sampling frequency of the audio information read by the optical pick-up 101.

For example, if the storage capacity of the first audio storage section 105 and the second audio storage section 108 for storing the audio data is fixed, the capacity of the audio data which can be stored in each audio storage section varies in inverse proportion to the sampling frequency of the audio data. Specifically, the higher the sampling frequency becomes, the less the audio-data capacity storable in each audio storage section becomes. In contrast, the lower the sampling frequency becomes, the greater the audio-data capacity storable in each audio storage section becomes.

For example, let's assume that the sampling frequency of the initial audio data recorded in the optical-disk medium 120 is 44.1 kHz. If this initial audio data's sampling frequency is converted to 36 kHz, then for example, the audio data which has a capacity 44.1/36≈1.34 times as great can be stored, even though the storage capacity of the first audio storage section 105 and the second audio storage section 108 is fixed.

Incidentally, if the sampling frequency is lowered, the sound quality outputted from the audio output section 111 can also be deteriorated. However, the fact that the audio is broken, as is often the case with the conventional optical-disk simultaneous reproduction apparatus 900, can be prevented from taking place. This helps produce a relatively desirable result.

In addition, the first audio compression section 104 and the second audio compression section 107 not only lower the audio information read by the optical pick-up 101 simply to a certain uniform sampling frequency, but also may also detect a silent interval included in the audio information and further lower the sampling frequency in this silent interval.

Or, the first audio compression section 104 and the second audio compression section 107 may also detect a voiceless interval included in the audio information read by the optical pick-up 101 and further lower the sampling frequency in this voiceless interval. This voiceless interval is equivalent, for example, if the initial audio data is a tune which is accompanied with a vocal, to an interlude interval which includes only an accompaniment, not the vocal. For example, if the initial audio data is a conference record or a conversation record, it is equivalent to an interval in which not its substantial conversation or conference but the surrounding noise is only recorded. Herein, the first audio compression section 104 and the second audio compression section 107 detect a voiceless interval by extracting an interval where only people's voices are recorded.

Or, the operation of the first audio compression section 104 and the second audio compression section 107 is not necessarily limited to such a silent interval. They may also detect an interlude interval, a prelude interval, or the like, and then, lower the sampling frequency in the interlude interval, the prelude interval, or the like. Further, the operation of the first audio compression section 104 and the second audio compression section 107 is not necessarily limited to a completely silent interval. They may also detect an interval where the sound volume is lower, and then lower the sampling frequency in this interval. Still further, the first audio compression section 104 and the second audio compression section 107 may also lower the sampling frequency step by step as the sound volume is lower.

Incidentally, if the sampling frequency is lowered, the sound quality can be degraded. However, in the above described silent interval, voiceless interval, interlude interval, prelude interval and the like, even if the sound quality is degraded, a relatively slight harmful effect is only produced. Hence, if these intervals are detected, the sampling frequency can be set far lower.

Moreover, in this embodiment, the sampling frequency of the whole audio data is lowered, and further, the sampling frequency of the audio data is lowered in the silent interval, the voiceless interval, the interlude interval and the prelude interval. However, the present invention is not limited especially to this. The sampling frequency of the audio data is only lowered in the silent interval, the voiceless interval, the interlude interval and the prelude interval. Then, the audio data in the intervals other than the silent interval, the voiceless interval, the interlude interval and the prelude interval may also be stored with kept intact.

Further, the operation of the first audio compression section 104 and the second audio compression section 107 may also vary the capacity-lowering ratio according to the sound volume of the audio information read by the optical pick-up 101. In this case, the capacity-lowering ratio is changed according to the sound volume of the audio information read by the optical pick-up 101. Therefore, if the sound volume of the audio information is less than a predetermined value, the capacity-lowering ratio is raised. In contrast, if the sound volume of the audio information is equal to, or more than, the predetermined value, then the capacity-lowering ratio is lowered. This allows a user to reproduce the audio information without feeling that something is wrong.

Still further, the operation of the first audio compression section 104 and the second audio compression section 107 may also vary the capacity-lowering ratio according to at least either of the quantity of a change in the sound pitch and the quantity of a change in the sound loudness of the audio information read by the optical pick-up 101. In this case, the capacity-lowering ratio is changed according to at least either of the quantity of a change in the sound pitch and the quantity of a change in the sound loudness of the audio information read by the optical pick-up 101. Therefore, if the quantity of a change in the sound pitch of the audio information is less than a predetermined value and if the quantity of a change in the sound loudness is less than a predetermined value, then the capacity-lowering ratio is made greater. In contrast, if the quantity of a change in the sound pitch of the audio information is equal to, or more than, the predetermined value and if the quantity of a change in the sound loudness is equal to, or more than, the predetermined value, then the capacity-lowering ratio is made smaller. This allows a user to reproduce the audio information without feeling that something is wrong.

Or, in another method of the audio-data capacity-lowering methods, for example, when audio data undergoes a pulse-code modulation, its quantization bit number is reduced. In the concrete, the first audio compression section 104 and the second audio compression section 107 reduce the quantization bit number of the audio information read by the optical pick-up 101.

For example, if the storage capacity of the first audio storage section 105 and the second audio storage section 108 for storing the audio data is fixed, the capacity of the audio data which can be stored in each audio storage section is determined by the compression ratio of the audio data, specifically, how much the quantization bit number is reduced.

For example, let's assume that the initial audio data recorded in the optical-disk medium 120 is quantized at 16 bits. If this audio data is converted so as to be quantized at 12 bits or 8 bits, for example, in an segmented-line approximation method, then for example, the audio data which has a capacity 16/12≈1.33 times or 16/8=2 times as great can be stored, even though the storage capacity of the first audio storage section 105 and the second audio storage section 108 is fixed.

In this case, the first audio compression section 104 and the second audio compression section 107 not only reduce the audio information read by the optical pick-up 101 simply to a certain uniform quantization bit number, but also may also detect a silent interval included in the audio information and further reduce the quantization bit number in this silent interval. Or, for example, they may also detect a voiceless interval and further reduce the quantization bit number in this voiceless interval. Further, the first audio compression section 104 and the second audio compression section 107 may also detect an interlude interval and a prelude interval, or the like and reduce the quantization bit number in the interlude interval and the prelude interval. If the quantization bit number is reduced, the sound quality can be degraded. However, in these intervals, even if the sound quality is degraded, comparatively, that brings only a little harmful effect. This is similar to the above described case.

Moreover, the first audio compression section 104 and the second audio compression section 107 may also switch the audio-data capacity-lowering method, for example, according to the contents of music to be reproduced. For example, if the audio contents are a piece of relatively fast-tempo music, the first audio compression section 104 and the second audio compression section 107 reduce the quantization bit number without lowering the sampling frequency when the audio data is subjected to a pulse-code modulation. In contrast, if the audio contents are a piece of relatively slow-tempo music, the first audio compression section 104 and the second audio compression section 107 lower the sampling frequency without reducing the quantization bit number when the audio data is subjected to a pulse-code modulation. This tempo can be measured, for example, according to either or both of the quantity of a change in the sound pitch and the quantity of a change in the sound loudness.

Or, further, the first audio compression section 104 and the second audio compression section 107 may also switch the audio-data capacity-lowering method, for example, according to each part of the contents of a piece of music to be reproduced. For example, if a specific part of the contents of a piece of audio is a relatively fast-tempo part, the first audio compression section 104 and the second audio compression section 107 reduce the quantization bit number without lowering the sampling frequency when the audio data undergoes a pulse-code modulation. In contrast, if a specific part of the contents of the piece of audio is a relatively slow-tempo part, the first audio compression section 104 and the second audio compression section 107 lower the sampling frequency without reducing the quantization bit number when the audio data undergoes a pulse-code modulation.

Or, still further, as the audio-data capacity-lowering method, for example, for the contents of a piece of music to be reproduced, both a sampling-frequency lowering method and a quantization bit-number reducing method may also be applied. Then, the first audio compression section 104 and the second audio compression section 107 can change the ratio at which they are applied to each part of the contents of the piece of music to be reproduced.

For example, if a specific part of the contents of the piece of music is a relatively fast-tempo part, the first audio compression section 104 and the second audio compression section 107 do not lower the sampling frequency too much and lower it slightly. Then, they reduce the quantization bit number relatively greatly. In contrast, if a specific part of the contents of a piece of audio is a relatively slow-tempo part, the first audio compression section 104 and the second audio compression section 107 do not reduce the quantization bit number too much and reduce it slightly. Then, they lower the sampling frequency relatively greatly.

In addition, control is executed so that a part of the audio data undergoes some capacity lowering, and then, it is stored in the first audio storage section 105 or the second audio storage section 108. On the other hand, the other part of the audio data does not undergo capacity lowering. In this case, the first audio compression section 104 and the second audio compression section 107 can change the capacity-lowering ratio gradually on the boundary between the part of the audio data whose capacity is lowered and the part of the audio data whose capacity is not lowered. Incidentally, the capacity-lowering ratio represents the ratio of the capacity of audio information after its capacity is lowered to the capacity of the audio information before its capacity is lowered.

Specifically, the first audio compression section 104 and the second audio compression section 107 raise the capacity-lowering ratio gradually from the part whose capacity is not lowered toward the part whose capacity is lowered. In contrast, they lower the capacity-lowering ratio gradually from the part whose capacity is lowered toward the part whose capacity is not lowered. In other words, if the capacity of a part of the audio data which has a sampling frequency of 44.1 kHz is lowered to be the audio data which has a sampling frequency of 36 kHz, the first audio compression section 104 and the second audio compression section 107 lower the sampling frequency gradually, from 44.1 kHz to 36 kHz, from the part whose capacity is not lowered toward the part whose capacity is lowered. On the other hand, the first audio compression section 104 and the second audio compression section 107 increase the sampling frequency gradually, from 36 kHz to 44.1 kHz, from the part whose capacity is lowered toward the part whose capacity is not lowered.

Similarly, if the capacity of a part of the audio data which has a quantization bit number of 16 bits is lowered to be the audio data which has a quantization bit number of 8 bits, the first audio compression section 104 and the second audio compression section 107 reduce the quantization bit number gradually, from 16 bits to 8 bits, from the part whose capacity is not lowered toward the part whose capacity is lowered. On the other hand, the first audio compression section 104 and the second audio compression section 107 raise the quantization bit number gradually, from 8 bits to 16 bits, from the part whose capacity is lowered toward the part whose capacity is not lowered.

If such control is executed, even though the capacity of audio data is lowered to degrade its audio quality, it is relatively hard for a viewer to notice this degradation.

Hence, lowering the capacity of audio data gives advantages in that, as described later, a larger quantity of audio data is stored in the first audio storage section 105 and the second audio storage section 108. Besides, as described later as well, the reproduction of audio data is prevented from being interrupted because the optical pick-up 101 takes a long time to execute a seek. Hence, for example, there is a case where the recording position on the record medium of data to be next read by the optical pick-up 101 is known, and the optical pick-up 101's seek time is known in advance or is almost anticipated. In this case, each such audio-data capacity-lowering method as described above is chosen or combined, so that the audio data can be continuously reproduced without a break for the seek time.

In this way, in order to reproduce the audio data continuously without a break for the seek time, the capacity of the audio data is lowered at a required minimum. This makes it possible to keep, at a minimum, the degradation of the audio quality of the contents of music or the like to be reproduced.

Moreover, the first audio compression section 104 and the second audio compression section 107 may also vary the capacity-lowering ratio of audio information read by the optical pick-up 101, based on the speed at which the optical pick-up 101 moves and scans on the optical-disk medium 120. In this case, the capacity-lowering ratio of audio information read by the optical pick-up 101 is changed based on the speed at which the optical pick-up 101 moves and scans on the optical-disk medium 120. Thus, if the speed at which the optical pick-up 101 moves and scans on the optical-disk medium 120 is more than a predetermined value, it is stored at a first capacity-lowering ratio. On the other hand, if the speed at which the optical pick-up 101 moves and scans on the optical-disk medium 120 is equal to, or less than, the predetermined value, then the period becomes longer from the time when it completed the reading of the first audio information to the time when it has moved to the reading position of the second audio information. Thus, it is stored at a second capacity-lowering ratio which is higher than the first capacity-lowering ratio. Therefore, according to the speed at which the optical pick-up 101 moves and scans on the optical-disk medium 120, the audio information can be reproduced without a break.

At this time, if the capacity-lowering ratio is set at zero, the audio information can be stored without lowering its capacity. Based upon the speed at which the optical pick-up 101 moves and scans on the optical-disk medium 120, the first audio compression section 104 and the second audio compression section 107 may also determine whether to lower the capacity of audio information read by the optical pick-up 101.

Furthermore, the first audio compression section 104 and the second audio compression section 107 may also vary the capacity-lowering ratio of audio information read by the optical pick-up 101, based on the storage capacity of the first audio storage section 105 and the second audio storage section 108.

In this case, based on the storage capacity of the first audio storage section 105 and the second audio storage section 108, the capacity-lowering ratio of audio information read by the optical pick-up 101 is changed. For example, if the storage capacity of the first audio storage section 105 and the second audio storage section 108 is more than a predetermined value, the audio information is stored at a first capacity-lowering ratio. On the other hand, if the storage capacity of the first audio storage section 105 and the second audio storage section 108 is equal to, or less than, the predetermined value, the audio information is stored at a second capacity-lowering ratio which is higher than the first capacity-lowering ratio. Therefore, if the storage capacity of the first audio storage section 105 and the second audio storage section 108 is large, it can be stored by lowering the capacity-lowering ratio.

At this time, if the capacity-lowering ratio is set at zero, the audio information can be stored without lowering its capacity. Based upon the storage capacity of the first audio storage section 105 and the second audio storage section 108, the first audio compression section 104 and the second audio compression section 107 may also determine whether to lower the capacity of audio information read by the optical pick-up 101.

In addition, the first audio compression section 104 and the second audio compression section 107 may also vary the capacity-lowering ratio of audio information read by the optical pick-up 101, based on the speed at which the optical pick-up 101 moves and scans on the optical-disk medium 120 and the storage capacity of the first audio storage section 105 and the second audio storage section 108.

In this case, based on the speed at which the optical pick-up 101 moves and scans on the optical-disk medium 120 and the storage capacity of the first audio storage section 105 and the second audio storage section 108, the capacity-lowering ratio of audio information read by the optical pick-up 101 is changed. For example, if the speed at which the optical pick-up 101 moves and scans on the optical-disk medium 120 is below a predetermined value and if the storage capacity of the first audio storage section 105 and the second audio storage section 108 is above a predetermined value, then the audio information is stored at a first capacity-lowering ratio. On the other hand, if the speed at which the optical pick-up 101 moves and scans on the optical-disk medium 120 is above the predetermined value and if the storage capacity of the first audio storage section 105 and the second audio storage section 108 is below the predetermined value, the audio information is stored at a second capacity-lowering ratio which is higher than the first capacity-lowering ratio. Therefore, even if the speed at which the optical pick-up 101 moves and scans on the optical-disk medium 120 is low, if the storage capacity of the first audio storage section 105 and the second audio storage section 108 is large, it can be stored by lowering the capacity-lowering ratio.

At this time, if the capacity-lowering ratio is set at zero, the audio information can be stored without lowering its capacity. Based upon the speed at which the optical pick-up 101 moves and scans on the optical-disk medium 120 and the storage capacity of the first audio storage section 105 and the second audio storage section 108, the first audio compression section 104 and the second audio compression section 107 may also determine whether to lower the capacity of audio information read by the optical pick-up 101.

Still further, the first audio compression section 104 and the second audio compression section 107 may also vary the capacity-lowering ratio of audio information read by the optical pick-up 101, based on the position on the optical-disk medium 120 in which audio information is recorded and the position on the optical-disk medium 120 in which image information is recorded.

In this case, based on the position on the optical-disk medium 120 in which audio information is recorded and the position on the optical-disk medium 120 in which image information is recorded, the capacity-lowering ratio of audio information read by the optical pick-up 101 is changed. Therefore, if the distance between the position on the optical-disk medium 120 in which audio information is recorded and the position on the optical-disk medium 120 in which image information is recorded is less than a predetermined value, the time becomes shorter at which the optical pick-up 101 scans on the optical-disk medium 120. Then, it is stored at a first capacity-lowering ratio. On the other hand, if the distance between the position on the optical-disk medium 120 in which audio information is recorded and the position on the optical-disk medium 120 in which image information is recorded is more than a predetermined value, the time becomes longer at which the optical pick-up 101 scans on the optical-disk medium 120. Then, it is stored at a second capacity-lowering ratio which is higher than the first capacity-lowering ratio.

Accordingly, as the position on the optical-disk medium 120 in which audio information is recorded goes farther away from the position on the optical-disk medium 120 in which image information is recorded, the capacity-lowering ratio is heightened. In contrast, as the position on the optical-disk medium 120 in which audio information is recorded comes closer to the position on the optical-disk medium 120 in which image information is recorded, the capacity-lowering ratio is lowered. Thereby, if the optical pick-up 101 does not take time to move, it can be stored by lowering the capacity-lowering ratio. This helps restrain its sound quality from lowering.

At this time, if the capacity-lowering ratio is set at zero, the audio information can be stored without lowering its capacity. Based upon the position on the optical-disk medium 120 in which audio information is recorded and the position on the optical-disk medium 120 in which image information is recorded, the first audio compression section 104 and the second audio compression section 107 may also determine whether to lower the capacity of audio information read by the optical pick-up 101.

The audio data whose capacity has been lowered, as described above, by the first audio compression section 104 and the second audio compression section 107, is stored in the first audio storage section 105 and the second audio storage section 108, respectively. On the other hand, the image data distinguished by the audio-and-image decision section 102 is switched by the input-image switch section 112. Then, it is alternately sent to the first image expansion section 113 and the second image expansion section 115. If the image data is stored in the second image storage section 116 or if the image data is not stored in either of the first image storage section 114 and the second image storage section 116, the input-image switch section 112 outputs the image data to the first image expansion section 113. If the image data is stored in the first image storage section 114, it outputs the image data to the second image expansion section 115.

In the first image expansion section 113 or the second image expansion section 115, for example, the image data compressed in a compression format such as a JPEG is restored to the initial image data which can be displayed. Then, it is stored in the first image storage section 114 or the second image storage section 116.

The audio data stored in the first audio storage section 105 or the second audio storage section 108 is restored to the former audio data by the first audio expansion section 106 or the second audio expansion section 109. Incidentally, the first audio expansion section 106 and the second audio expansion section 109 expand the audio data compressed by the first audio compression section 104 and the second audio compression section 107, using parameter information which is outputted by the audio-and-image decision section 102.

The audio data restored by the first audio expansion section 106 or the second audio expansion section 109 is alternately switched by the output-audio switch section 110. Then, it is alternately outputted by the audio output section 111, respectively. Specifically, the output-audio switch section 110 outputs the audio data expanded by the first audio expansion section 106 to the audio output section 111. Thereafter, it outputs the audio data expanded by the second audio expansion section 109 to the audio output section 111. Then, the output-audio switch section 110 outputs the audio data expanded by the second audio expansion section 109 to the audio output section 111. Thereafter, it outputs the audio data expanded by the first audio expansion section 106 to the audio output section 111.

The restoration of the audio data to its original state by the first audio expansion section 106 or the second audio expansion section 109 is executed, for example, by extrapolating using a linear extrapolation and an approximation accompanied with periodic fluctuations such as a trigonometric function. At this time, the degradation of audio is unavoidable to some degree, but the method of avoiding such degradation to the utmost has already been described earlier.

Switching is executed by the input-audio switch section 103, and thereby, the audio data is, for example, inputted in the first audio compression section 104 and stored in the first audio storage section 105. At this time, switching is executed by the output-audio switch section 110, and thereby, the audio data stored in the second audio storage section 108 is outputted from the audio output section 111.

In contrast, switching is executed by the input-audio switch section 103, and thereby, the audio data is, for example, inputted in the second audio compression section 107 and stored in the second audio storage section 108. At this time, switching is executed by the output-audio switch section 110, and thereby, the audio data stored in the first audio storage section 105 is outputted from the audio output section 111. These switching operations make it possible to output the audio data continuously and unbrokenly from the audio output section 111.

In the same way, the image data stored in the first image storage section 114 or the second image storage section 116 is alternately switched by the output-image switch section 117. Then, it is alternately outputted by the image output section 118, respectively. Specifically, the output-image switch section 117 outputs the image data read from the first image storage section 114 to the image output section 118. Thereafter, it outputs the image data read from the second image storage section 116 to the image output section 118. Then, the output-image switch section 117 outputs the image data read from the second image storage section 116 to the image output section 118. Thereafter, it outputs the image data read from the first image storage section 114 to the image output section 118.

When the image data is stored, for example, in the first image storage section 114 through switching by the input-image switch section 112, the image data stored in the second image storage section 116 through switching by the output-image switch section 117 is outputted from the image output section 118.

In contrast, when the image data is stored, for example, in the second image storage section 116 through switching by the input-image switch section 112, the image data stored in the first image storage section 114 through switching by the output-image switch section 117 is outputted from the image output section 118. These switching operations also make it possible to output the image data continuously and unbrokenly from the image output section 118.

These image data and audio data are, for example, static-image contents and audio contents that explain these image contents which are recorded in the single optical-disk medium 901. Hence, they need to be concurrently reproduced so as to synchronize in exact timing. This requires that both the image data and the audio data be continuously reproduced without a break.

Herein, in this embodiment, the optical pick-up 101 corresponds to an example of the reading means; the first audio compression section 104 and the second audio compression section 107, to an example of the capacity-lowering means; the first audio storage section 105 and the second audio storage section 108, to an example of the audio storing means; the audio output section 111, to an example of the audio reproducing means; the first image storage section 114 and the second image storage section 116, to an example of the another-kind-of-information storing means; the image output section 118, to an example of the another-kind-of-information reproducing means; the audio-and-image decision section 102, to an example of the information deciding means; and the first audio expansion section 106 and the second audio expansion section 109, to an example of the audio reproducing means and the expanding means.

Figure 2:
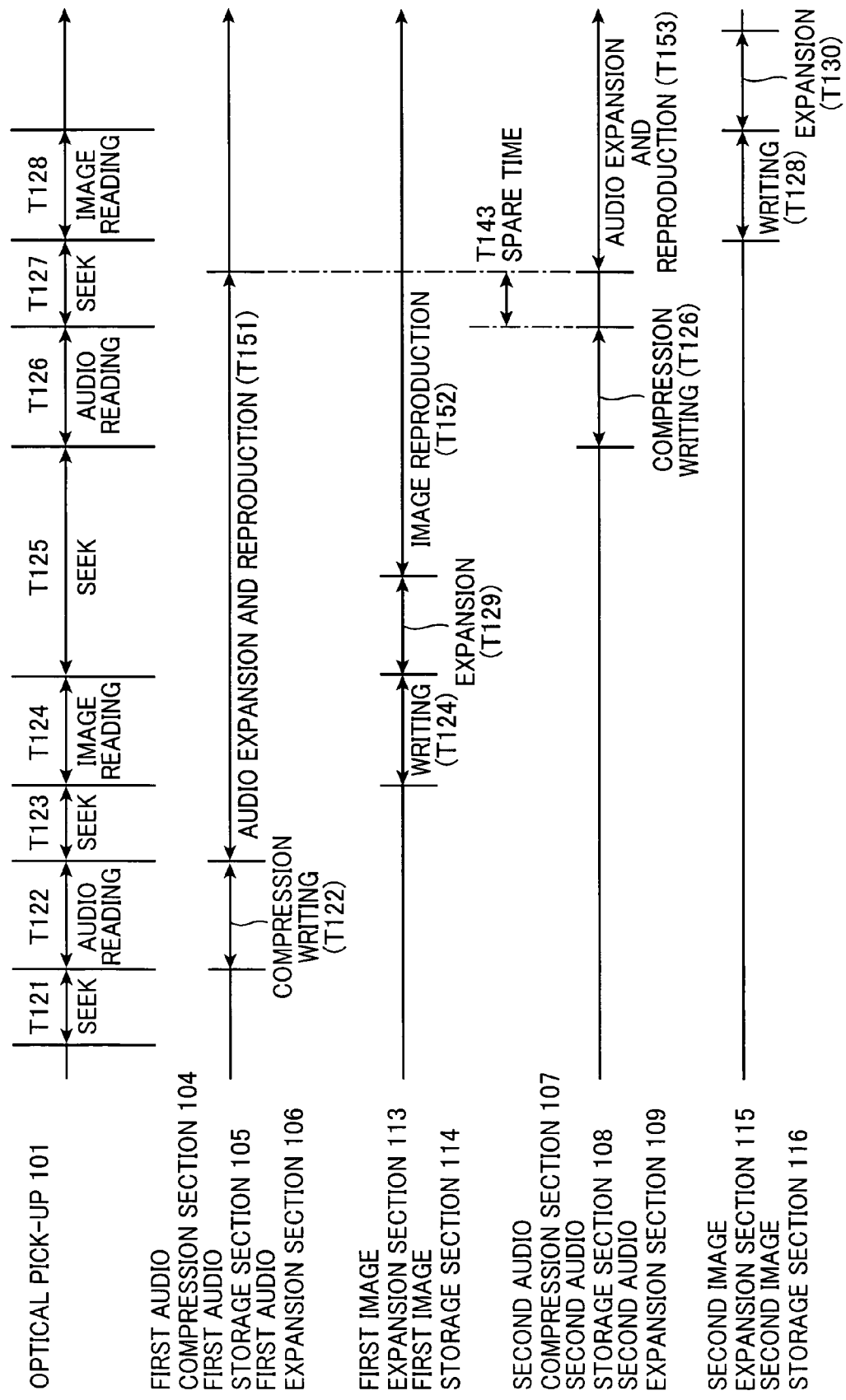
FIG. 2 is a timing chart, showing an example of the reproduction of the optical-disk simultaneous reproduction apparatus shown in FIG. 1.
Figure 3:
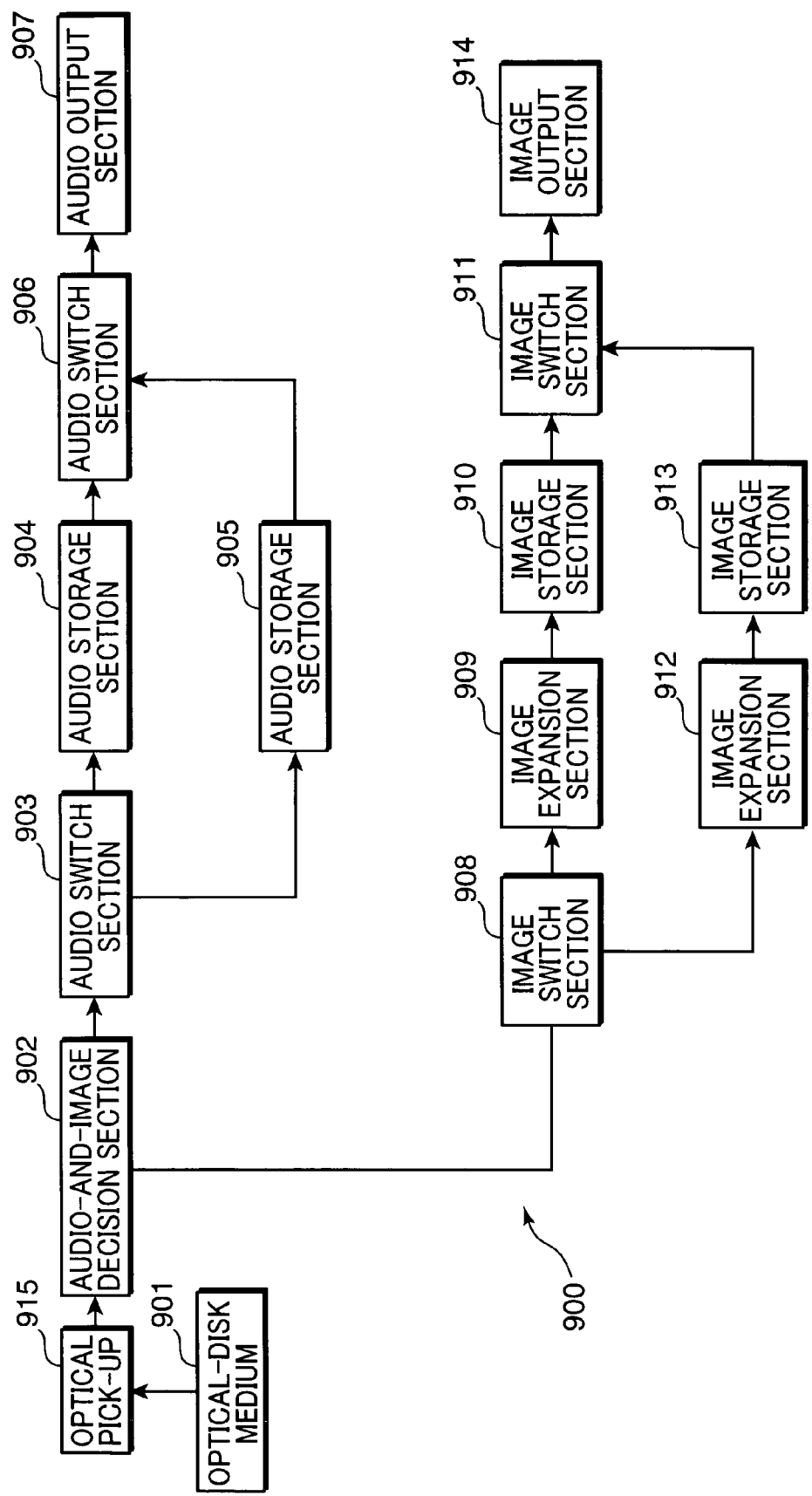
FIG. 3 is a block diagram, showing the configuration of the main part of a conventional optical-disk simultaneous reproduction apparatus.

FIG. 2 is a timing chart, showing an example of the reproduction at the time when audio data and image data are concurrently reproduced in the optical-disk simultaneous reproduction apparatus 100 shown in FIG. 1.

Figure 4:
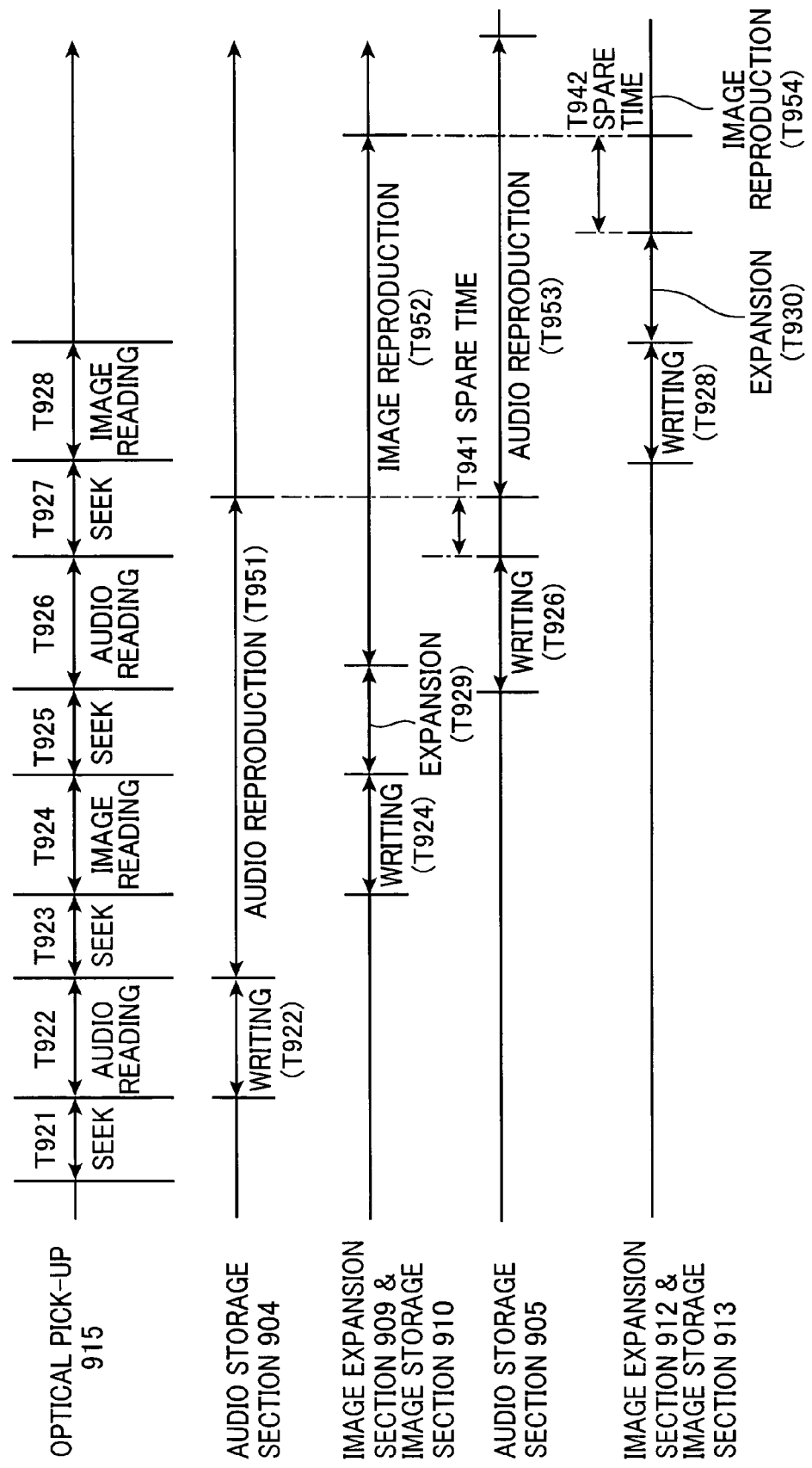
FIG. 4 is a timing chart, showing the reproduction at the normal time of the conventional optical-disk simultaneous reproduction apparatus.
Figure 5:
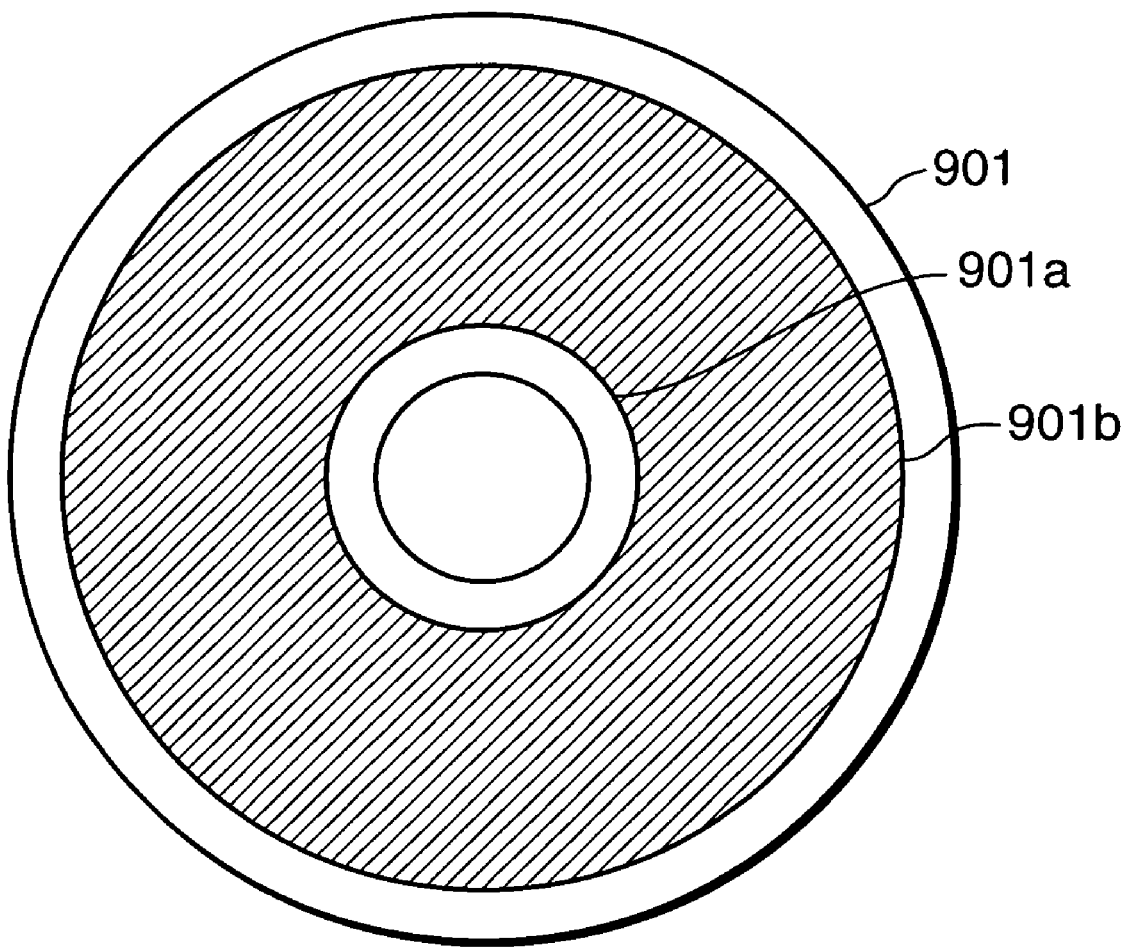
FIG. 5 is an illustration, showing the position in which audio data is recorded and the position in which image data is recorded in an optical-disk medium.

This timing chart shown in FIG. 2 is the same, in a large number of respects, as the reproduction timing chart at the normal time in the conventional optical-disk simultaneous reproduction apparatus 900 shown in FIG. 4. Hence, a simple description will be given about those similar parts, and thus, only the different parts will be described in detail.

First, the optical pick-up 101 seeks for reading audio data from the optical-disk medium 120. This period of time is denoted by "T121". After this, without specific notice, the period when each operation is executed is designated by "T" and the following numeral. This "T" and the following three-digit number indicates the period when each operation is executed and the period's length at the same time. This is the same as the reproduction timing chart at the normal time (see FIG. 4) in the conventional optical-disk simultaneous reproduction apparatus 900.

Next, the optical pick-up 101 moves to a required place on the optical-disk medium 120 in the seek (T121). Then, it reads the audio data (T122). Sequentially, the audio-and-image decision section 102 decides which the data read by the optical pick-up 101 is, audio data or image data. The audio-and-image decision section 102 decides that the audio data read from the optical-disk medium 120 is audio data. Then, it is outputted to the input-audio switch section 103. The input-audio switch section 103 outputs the inputted audio data, for example, to the first audio compression section 104. The first audio compression section 104 lowers the capacity of the inputted audio data the inputted audio data in such various methods as described above. Then, it stores it in the first audio storage section 105 (T122). As shown in FIG. 2, this whole processing is executed, in parallel with the reading of the audio data from the optical-disk medium 120 by the optical pick-up 101, for this period of time (T122).

The audio data stored in the first audio storage section 105 is expanded (or restored) to its original audio data by the first audio expansion section 106. Then, it is outputted through the output-audio switch section 110 from the audio output section 111 (T151). In the above described serial processing, the audio contents recorded in the optical-disk medium 120 are reproduced.

At this time, the capacity of the audio data stored in the first audio storage section 105 is lowered by the first audio compression section 104. Hence, even if it has the same storage capacity as the conventional audio storage section 904, in this embodiment, a larger quantity of audio data can be stored. Therefore, the period (T151) for which the contents of audio are outputted and reproduced from the audio output section 111 is by far longer than the period (T951) for which the contents of audio are outputted and reproduced from the conventional audio output section 907. In this respect, this embodiment is largely different from the conventional optical-disk simultaneous reproduction apparatus 900.

Next, the optical pick-up 101 seeks to a necessary position for reading image data from the optical-disk medium 120 (T123). Then, it reads the targeted image data from the seek position on the optical-disk medium 120 (T124). Sequentially, the audio-and-image decision section 102 decides whether the data read by the optical pick-up 101 is audio data or image data. The audio-and-image decision section 102 decides that the image data read from the optical-disk medium 120 is image data. Then, it is outputted to the input-image switch section 112. The input-image switch section 112 outputs the inputted image data, for example, to the first image expansion section 113. The first image expansion section 113 once stores the inputted image data. In this way, the processing for writing the image data via the input-image switch section 112, for example, in the first image expansion section 113 is executed in parallel with the reading of the image data by the optical pick-up 101 (T124).

Next, the first image expansion section 113 expands the written image data (T129). Then, it stores the image data which it has expanded in the first image storage section 114. The image data stored in the first image storage section 114 is outputted through the output-image switch section 117 from the image output section 118 (T152). In the above described serial processing, the image contents recorded in the optical-disk medium 120 are reproduced.

After finishing reading the image data (T124), the optical pick-up 101 seeks to the position on the optical-disk medium 120 which is necessary for reading the next audio data (T125).

In this embodiment, in order to explain advantageous points of the present invention, a case is illustrated in which audio data to be reproduced is reproduced discontinuously and brokenly in the above described conventional optical-disk simultaneous reproduction apparatus 900. This occurs when the seek time (T125) is extremely long from the completion of the reading of image data by the optical pick-up 101 to the completion of its movement up to the reading position of the next audio data.

Through this seek (T125), the optical pick-up 101 moves to the position on the optical-disk medium 120 which is necessary for reading the next audio data. Then, the optical pick-up 101 reads the next audio data from this optical-disk medium 120 (T126).

The audio data read from the optical-disk medium 120 is simultaneously outputted to the audio-and-image decision section 102. The audio-and-image decision section 102 decides whether the data read by the optical pick-up 101 is audio data or image data. The audio-and-image decision section 102 decides that the audio data read from the optical-disk medium 120 is audio data. Then, it is outputted to the input-audio switch section 103. At this time, the audio data is stored in the first audio storage section 105. Thus, the input-audio switch section 103 outputs the inputted audio data, this time, for example, to the second audio compression section 107 different from the preceding one. The second audio compression section 107 lowers the capacity of the inputted audio data and stores it in the second audio storage section 108 (T126). In this way, the preparation is completed for outputting the audio data stored in the second audio storage section 108 through the output-audio switch section 110 from the audio output section 111.

Figure 6:
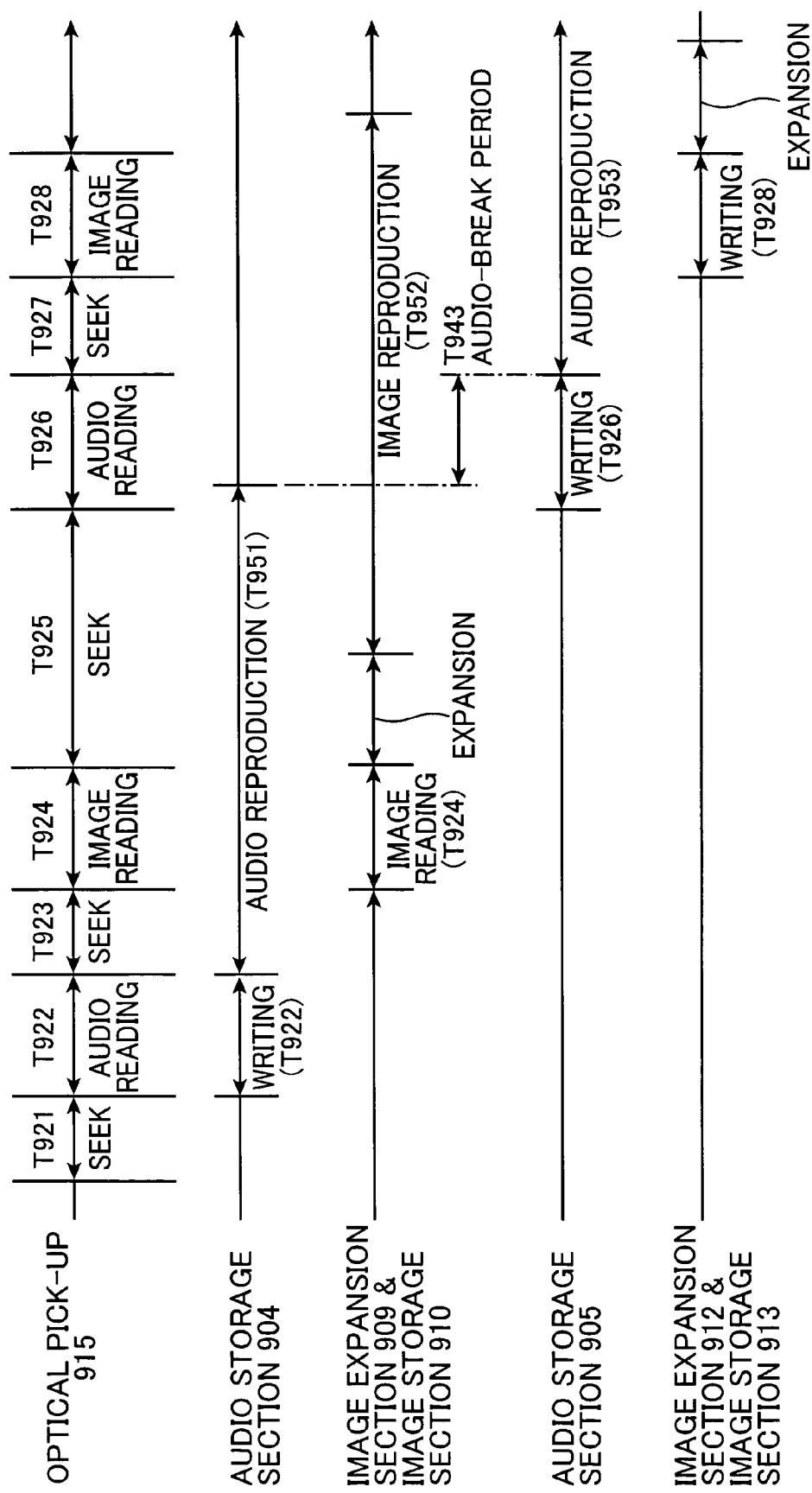
FIG. 6 is a timing chart, showing the reproduction at an abnormal time of the conventional optical-disk simultaneous reproduction apparatus.

At this time, in the above described conventional optical-disk simultaneous reproduction apparatus 900, as shown in FIG. 6, if the seek time (T925) of the optical pick-up 915 is extremely long, the period of time (T943) for which the audio is broken is produced. This is because the reproduction period (T951) of the audio data read before stored in the audio storage section 904 has already passed.

However, in the optical-disk simultaneous reproduction apparatus 100 according to the embodiment of the present invention, as shown in FIG. 2, in the first audio storage section 105, audio data is compressed and written (T122) and is expanded and reproduced (T151). This makes the substantial storage capacity of the first audio storage section 105 extremely large. Thereby, the period (T151) for which the audio data is expanded and reproduced also becomes extremely long. Hence, the reproduction of the preceding audio data stored in the first audio storage section 105 is not yet completed, thus producing a certain spare time (T143).

After this spare time (T143) has elapsed, the audio data stored in the second audio storage section 108 is outputted to the second audio expansion section 109. The second audio expansion section 109 expands the audio data inputted from the second audio storage section 108. Then, it outputs it to the output-audio switch section 110. The output-audio switch section 110 outputs the audio data expanded by the second audio expansion section 109 to the audio output section 111. The audio output section 111 outputs the audio (T153).

In this way, in the optical-disk simultaneous reproduction apparatus 100 according to the embodiment of the present invention, when the seek time (T125) from the completion of the reading of image data by the optical pick-up 101 to the completion of its movement up to the reading position of the next audio data has become extremely long because of some cause or other, the audio data is compressed and written (T122) and is expanded and reproduced (T151) in the first audio storage section 105. This makes it possible to make the substantial storage capacity of the first audio storage section 105 extremely large. Thus, the period (T151) for which the audio data is expanded and reproduced can also be extremely lengthened.

Furthermore, audio information is read from the optical-disk medium 120, image information recorded in a different position from the position of the audio information is read from the optical-disk medium 120, and the capacity of the read audio information is lowered. Then, the audio information whose capacity has been lowered is stored, and the stored audio information is reproduced. Further, another kind of information which has been read is stored, and another kind of information which has been stored is reproduced. The audio information includes first audio information and second audio information which is continuously reproduced after the first audio information. Then, the capacity of the first audio information is lowered, so that the reading of the second audio information is completed before the reproduction of the first audio information is completed, for the period of time when the image information is reproduced.

Accordingly, the capacity of the first audio information is lowered and stored, so that the reading of the second audio information is completed before the reproduction of the first audio information is completed. Therefore, without increasing the storage capacity of the first audio storage section 105 and the second audio storage section 108, the audio information can be reproduced continuously and unbrokenly.

Then, the preparation is completed for outputting the audio data stored in the second audio storage section 108 through the output-audio switch section 110 from the audio output section 111. At this point of time, the reproduction of the preceding audio data stored in the first audio storage section 105 is not yet completed, thus producing a certain spare time (T143).

As described above, even if the seek time (T125) from the completion of the reading of image data by the optical pick-up 101 to the completion of its movement up to the reading position of the next audio data has become extremely long because of some cause or other, the audio contents are continuously read from the optical-disk medium 120 and uninterruptedly reproduced without a break. In this respect, the optical-disk simultaneous reproduction apparatus 100 according to the embodiment of the present invention is largely different from the conventional optical-disk simultaneous reproduction apparatus 900.

In terms of the processing after this, the optical-disk simultaneous reproduction apparatus 100 according to the embodiment of the present invention is substantially the same as the conventional optical-disk simultaneous reproduction apparatus 900. Hence, a detailed description is omitted.

Incidentally, when the optical pick-up 101 reads audio data or image data from the optical-disk medium 120, not only the above described seek time, in practice, but also a rotation waiting time, a synchronism time, or a time taken for another processing, are required. However, this is not directly related to the real nature of the present invention. Thus, in this embodiment, each such kind of time is all included in the seek time.

In addition, in the above described embodiment, the first audio storage section 105 and the second audio storage section 108 are provided as the audio storage section, and the first image storage section 114 and the second image storage section 116 are provided as the image storage section. Then, these audio storage section and image storage section are alternately switched and used by the input-audio switch section 103 and the output-audio switch section 110, and the input-image switch section 112 and the output-image switch section 117, respectively.

However, in another embodiment, the audio storage section and the image storage section not necessarily have to be provided with two systems or more, respectively, as described above. Hence, an embodiment may also be implemented in which a single system is used for each of the audio storage section and the image storage section.

If the audio storage section is one system, there is no need for the input-audio switch section 103, the second audio compression section 107, the second audio storage section 108, the second audio expansion section 109 and the output-audio switch section 110. Hence, the reproduction processing circuit 130 is formed by the audio-and-image decision section 102, the first audio compression section 104 and the first audio expansion section 106.

Or, an embodiment may also be implemented in which the audio storage section and the image storage section are provided with two systems or more, respectively. Besides, an embodiment may also be implemented in which different areas within one memory area are used.

Still further, in this embodiment, audio data and image data are alternately read from the optical-disk medium 120. However, audio data and image data not necessarily have to be alternately read from the optical-disk medium 120 like this embodiment. An embodiment may also be implemented in which, for example, after one image data has been read, the optical pick-up 101 successively seeks and reads audio data divided and stored in two or more areas on the optical-disk medium 120. Such an embodiment is not essentially different from the present embodiment, and thus, a detailed description is omitted.

Herein, the above described specific embodiment mainly includes the invention which has the following configurations.

A reproduction apparatus according to the present invention which reads and reproduces audio information and another kind of information from a record medium where the audio information and another kind of information are recorded, characterized in that: the reproduction apparatus includes a reading means for reading the audio information from the record medium, and reading, from the record medium, another kind of information recorded in a different position from the position of the audio information, a capacity-lowering means for lowering the capacity of the audio information read by the reading means, an audio storing means for storing the audio information whose capacity is lowered by the capacity-lowering means, an audio reproducing means for reproducing the audio information stored in the audio storing means, an another-kind-of-information storing means for storing another kind of information read by the reading means, and an another-kind-of-information reproducing means for reproducing another kind of information stored in the another-kind-of-information storing means; the audio information includes first audio information, and second audio information which is continuously reproduced after the first audio information; and the capacity-lowering means lowers the capacity of the first audio information read by the reading means, so that the reading of the second audio information is completed before the reproduction of the first audio information is completed, for the period of time when another kind of information is reproduced by the another-kind-of-information reproducing means.

A reproduction method according to the present invention for reading and reproducing audio information and another kind of information from a record medium where the audio information and another kind of information are recorded, characterized in that: the reproduction method includes, an audio-information reading step of reading the audio information from the record medium, a capacity-lowering step of lowering the capacity of the audio information read in the audio-information reading step, an audio storing step of storing, in an audio storing means, the audio information whose capacity is lowered in the capacity-lowering step, an audio reproducing step of reproducing the audio information stored in the audio storing means, an another-kind-of-information reading step of reading, from the record medium, another kind of information recorded in a different position from the position of the audio information, an another-kind-of-information storing step of storing, in an another-kind-of-information storing means, another kind of information read in the another-kind-of-information reading step, and an another-kind-of-information reproducing step of reproducing another kind of information stored in the another-kind-of-information storing means; the audio information includes first audio information, and second audio information which is continuously reproduced after the first audio information; and in the capacity-lowering step, the capacity of the first audio information read in the audio-information reading step is lowered, so that the reading of the second audio information is completed before the reproduction of the first audio information is completed, for the period of time when another kind of information is reproduced in the another-kind-of-information reproducing step.

A reproduction program according to the present invention for reading and reproducing audio information and another kind of information from a record medium where the audio information and another kind of information are recorded, characterized in that: the reproduction program allows a computer to function as, a reading means for reading the audio information from the record medium, and reading, from the record medium, another kind of information recorded in a different position from the position of the audio information, a capacity-lowering means for lowering the capacity of the audio information read by the reading means, an audio storing means for storing the audio information whose capacity is lowered by the capacity-lowering means, an audio reproducing means for reproducing the audio information stored in the audio storing means, an another-kind-of-information storing means for storing another kind of information read by the reading means, and an another-kind-of-information reproducing means for reproducing another kind of information stored in the another-kind-of-information storing means; the audio information includes first audio information, and second audio information which is continuously reproduced after the first audio information; and the capacity-lowering means lowers the capacity of the first audio information read by the reading means, so that the reading of the second audio information is completed before the reproduction of the first audio information is completed, for the period of time when another kind of information is reproduced by the another-kind-of-information reproducing means.

A computer-readable record medium where a reproduction program is recorded according to the present invention for reading and reproducing audio information and another kind of information from a record medium where the audio information and another kind of information are recorded, characterized in that: the reproduction program allows a computer to function as, a reading means for reading the audio information from the record medium, and reading, from the record medium, another kind of information recorded in a different position from the position of the audio information, a capacity-lowering means for lowering the capacity of the audio information read by the reading means, an audio storing means for storing the audio information whose capacity is lowered by the capacity-lowering means, an audio reproducing means for reproducing the audio information stored in the audio storing means, an another-kind-of-information storing means for storing another kind of information read by the reading means, and an another-kind-of-information reproducing means for reproducing another kind of information stored in the another-kind-of-information storing means; the audio information includes first audio information, and second audio information which is continuously reproduced after the first audio information; and the capacity-lowering means lowers the capacity of the first audio information read by the reading means, so that the reading of the second audio information is completed before the reproduction of the first audio information is completed, for the period of time when another kind of information is reproduced by the another-kind-of-information reproducing means.

According to this configuration, audio information is read from a record medium, another kind of information recorded in a different position from the position of the audio information is read from the record medium, and the capacity of the read audio information is lowered. Then, the audio information whose capacity has been lowered is stored, and the stored audio information is reproduced. Further, another kind of information which has been read is stored, and another kind of information which has been stored is reproduced. The audio information includes first audio information and second audio information which is continuously reproduced after the first audio information. The second audio information is continuously reproduced after the reproduction of the first audio information has been completed. Then, the capacity of the first audio information is lowered, so that the reading of the second audio information is completed before the reproduction of the first audio information is completed, for the period of time when another kind of information is reproduced.

Accordingly, the capacity of the first audio information is lowered and stored, so that the reading of the second audio information is completed before the reproduction of the first audio information is completed. Therefore, the time for reproducing the audio information can be extended without increasing the storage capacity of a storing means. Hence, even if a certain time is taken to read the next audio information or another kind of information, a plurality of pieces of audio information can be reproduced continuously and unbrokenly.

In the above described reproduction apparatus, preferably, another kind of information should be at least either of image information and video information. According to this configuration, for the period when at least either of image information and video information is reproduced, audio information can be reproduced continuously and unbrokenly.

Furthermore, in the above described reproduction apparatus, it is preferable that the capacity-lowering means lower the sampling frequency of the audio information read by the reading means. According to this configuration, the sampling frequency of the read audio information is lowered. This helps easily lower the capacity of the audio information.

Moreover, in the above described reproduction apparatus, preferably, the capacity-lowering means should reduce the quantization bit number of the audio information read by the reading means. According to this configuration, the quantization bit number of the read audio information is reduced. This helps easily lower the capacity of the audio information.

In addition, in the above described reproduction apparatus, it is preferable that the capacity-lowering means detect at least one of the silent interval, interlude interval, prelude interval and voiceless interval of the audio information read by the reading means, and lower the capacity of only the part which corresponds to at least the one of the silent interval, interlude interval, prelude interval and voiceless interval.

According to this configuration, at least one is detected of the silent interval, interlude interval, prelude interval and voiceless interval of the read audio information. Then, the capacity is lowered of only the part which corresponds to at least the one of the silent interval, interlude interval, prelude interval and voiceless interval which has been detected. Hence, not all the intervals of the audio information are subjected to capacity lowering. The capacity of only the part which corresponds to at least the one of the silent interval, interlude interval, prelude interval and voiceless interval of the audio information is lowered. Therefore, even if the capacity of such a part is lowered, a user can reproduce the audio information without feeling that something is wrong.

Furthermore, in the above described reproduction apparatus, preferably, the capacity-lowering means should change the capacity-lowering ratio in accordance with the sound volume of the audio information read by the reading means. According to this configuration, the capacity-lowering ratio is changed in accordance with the sound volume of the read audio information. Therefore, if the sound volume of the audio information is below a predetermined value, the capacity-lowering ratio is raised. On the other hand, if the sound volume of the audio information is equal to, or more than, the predetermined value, then the capacity-lowering ratio is decreased. This allows a user to reproduce the audio information without feeling that something is wrong. Incidentally, the capacity-lowering ratio represents the ratio of the capacity of audio information after its capacity is lowered to the capacity of the audio information before its capacity is lowered.

Moreover, in the above described reproduction apparatus, it is preferable that the capacity-lowering means change the capacity-lowering ratio in accordance with at least either of the quantity of a change in the sound pitch and the quantity of a change in the sound loudness of the audio information read by the reading means.

According to this configuration, the capacity-lowering ratio is changed in accordance with at least either of the quantity of a change in the sound pitch and the quantity of a change in the sound loudness of the read audio information. Therefore, if the quantity of a change in the sound pitch of the audio information is below a predetermined value and if the quantity of a change in the quantity of a change in the sound loudness is below a predetermined value, then the capacity-lowering ratio is heightened. In contrast, if the quantity of a change in the sound pitch of the audio information is equal to, or more than, the predetermined value and if the quantity of a change in the quantity of a change in the sound loudness is equal to, or more than, the predetermined value, then the capacity-lowering ratio is lowered. This allows a user to reproduce the audio information without feeling that something is wrong.

In addition, in the above described reproduction apparatus, preferably, if the capacity-lowering means lowers the capacity of a part of the audio information read by the reading means, the capacity-lowering means should change the capacity-lowering ratio gradually on the boundary between the audio information of the part whose capacity is lowered and the audio information of the part whose capacity is not lowered.

According to this configuration, if the capacity of a part of the audio information is lowered, the capacity-lowering ratio is gradually changed on the boundary between the audio information of the part whose capacity is lowered and the audio information of the part whose capacity is not lowered. Therefore, the capacity-lowering ratio is decreased step by step from the part whose capacity is lowered to the part whose capacity is not lowered. On the other hand, the capacity-lowering ratio is raised step by step from the part whose capacity is not lowered to the part whose capacity is lowered. This allows a user to reproduce the audio information without feeling that something is wrong.

Furthermore, in the above described reproduction apparatus, it is preferable that the capacity-lowering means change the capacity-lowering ratio of the audio information read by the reading means, based on the storage capacity of the audio storing means.

According to this configuration, based on the storage capacity of the audio storing means, the capacity-lowering ratio of the read audio information is changed. Therefore, if the storage capacity of the audio storing means is large enough and if the audio information for the period from the completion of the reading of audio information to the completion of the reading of the next audio information can be stored in the audio storing means, then the capacity-lowering ratio of the read audio information is lowered so that it can be stored. This helps restrain its sound quality from lowering.

Moreover, in the above described reproduction apparatus, preferably, the record medium where the audio information and another kind of information are recorded should be a disk-shaped rotary record medium. According to this configuration, the record medium where the audio information and another kind of information are recorded is a disk-shaped rotary record medium. Therefore, audio information and another kind of information can be recorded in a disk-shaped rotary record medium.

In addition, in the above described reproduction apparatus, it is preferable that in the disk-shaped rotary record medium, information be recorded using one of a magnetic phenomenon, an optical phenomenon, an electrical phenomenon and a combination of some of these phenomena. According to this configuration, in the disk-shaped rotary record medium, information is recorded using one of a magnetic phenomenon, an optical phenomenon, an electrical phenomenon and a combination of some of these phenomena.

Furthermore, in the above described reproduction apparatus, preferably, the reading means should include a head which executes a scan on the disk-shaped rotary record medium and reads information recorded thereon using one of a magnetic phenomenon, an optical phenomenon, an electrical phenomenon and a combination of some of these phenomena.

According to this configuration, a scan is executed on the disk-shaped rotary record medium. Then, information is read which is recorded thereon using one of a magnetic phenomenon, an optical phenomenon, an electrical phenomenon and a combination of some of these phenomena.

Moreover, in the above described reproduction apparatus, it is preferable that the capacity-lowering means change the capacity-lowering ratio of the audio information read by the reading means, based on the movement speed of the head.

According to this configuration, the capacity-lowering ratio of the read audio information is changed based on the movement speed of the head. Therefore, if the speed at which the head moves is more than a predetermined value, the period is short from the time when it has completed the reading of the first audio information to the time when it moves to the reading position of the second audio information. Thus, the capacity-lowering ratio of the audio information is lowered. On the other hand, if the speed at which the head moves is equal to, or less than, the predetermined value, then the period becomes longer from the time when it has completed the reading of the first audio information to the time when it moves to the reading position of the second audio information. Thus, the capacity-lowering ratio of the audio information can be heightened. Therefore, according to the speed at which the head moves, the audio information can be reproduced without a break.

In addition, in the above described reproduction apparatus, preferably, the capacity-lowering means should change the capacity-lowering ratio of the audio information read by the reading means, based on the movement speed of the head and the storage capacity of the audio storing means.

According to this configuration, based on the movement speed of the head and the storage capacity of the audio storing means, the capacity-lowering ratio of the read audio information is changed. Even if the speed at which the head moves is low, if the storage capacity of the audio storing means is large, it can be stored by lowering the capacity-lowering ratio. This helps restrain its sound quality from lowering.

Furthermore, in the above described reproduction apparatus, it is preferable that the capacity-lowering means change the capacity-lowering ratio of the audio information read by the reading means, based on the position on the record medium in which the audio information is recorded and the position on the record medium in which another kind of information is recorded.

According to this configuration, based on the position on the record medium in which the audio information is recorded and the position on the record medium in which another kind of information is recorded, the capacity-lowering ratio of the read audio information is changed. Therefore, as the position on the record medium in which the audio information is recorded goes farther away from the position on the record medium in which another kind of information is recorded, the capacity-lowering ratio is heightened. In contrast, as the position on the record medium in which the audio information is recorded comes closer to the position on the record medium in which another kind of information is recorded, the capacity-lowering ratio is lowered. Thereby, if the head does not take time to move, it can be stored by lowering the capacity-lowering ratio. This helps restrain its sound quality from being degraded.

A reproduction processing circuit according to the present invention which reproduces audio information and another kind of information read from a record medium where the audio information and another kind of information are recorded, characterized in that: the reproduction processing circuit includes, an information deciding section for deciding which the information read from the record medium is, the audio information or another kind of information, a capacity-lowering section for, if the decision is made that the information read from the record medium is the audio information, then lowering the capacity of the audio information and storing the audio information whose capacity is lowered in an audio storing section, and an expanding section for expanding the audio information stored in the audio storing section; the audio information includes first audio information, and second audio information which is continuously reproduced after the first audio information; and the capacity-lowering section lowers the capacity of the first audio information expanded by the expanding section, so that the reading of the second audio information is completed before the reproduction of the first audio information is completed.

According to this configuration, a decision is made which the information read from the record medium is, the audio information or another kind of information. If the decision is made that the information read from the record medium is the audio information, then the capacity of the audio information is lowered and the audio information whose capacity has been lowered is stored in an audio storing section. Then, the audio information stored in the audio storing section is expanded. The audio information includes first audio information and second audio information which is continuously reproduced after the first audio information. The capacity of the expanded first audio information is lowered, so that the reading of the second audio information is completed before the reproduction of the first audio information is completed.

Accordingly, the capacity of the first audio information is lowered and stored, so that the reading of the second audio information is completed before the reproduction of the first audio information is completed. Therefore, without increasing the storage capacity of a storing means, the audio information can be reproduced continuously and unbrokenly.

Industrial Applicability

The reproduction apparatus, reproduction processing circuit, reproduction method, reproduction program, and computer-readable record medium where a reproduction program is recorded, according to the present invention, are capable of reproducing audio data continuously and unbrokenly, without increasing the storage capacity of a storing means. Hence, they are useful as a reproduction apparatus, a reproduction processing circuit, a reproduction method, a reproduction program, a computer-readable record medium where a reproduction program is recorded, and the like, which read and reproduce audio information and another kind of information from a record medium where the audio information and another kind of information are recorded.

The invention claimed is:

1. A reproduction apparatus which reads and reproduces audio information and other information, from a recording medium where the audio information and the other information are recorded, the reproduction apparatus comprising:
   a reading section for reading, from the recording medium, the audio information and the other information, recorded in a different position, on the recording medium, from a position of the audio information;
   a capacity-lowering section for lowering a capacity of the audio information read by the reading section, by reducing a quantization bit number of the audio information when a tempo in the audio information is fast and by lowering a sampling frequency of the audio information when the tempo in the audio information is slow;
   an audio storing section for storing the audio information having a lowered capacity;

an audio reproducing section for reproducing the audio information stored in the audio storing section;

an other information storing section for storing the other information read by the reading section; and an other information reproducing section for reproducing the other information stored in the other information storing section, wherein the audio information includes first audio information and second audio information, the second audio information being continuously reproduced after the first audio information; and the capacity-lowering section lowers the capacity of the first audio information read by the reading section, such that a time for reproducing the first audio information is longer than a time required for reading the second audio information, during a period of time when the other information is reproduced by the other information reproducing section, and divides the first audio information read by the reading section into a first part whose capacity is lowered by a predetermined capacity-lowering ratio, a second part whose capacity is not lowered, and a third part corresponding to a predetermined interval between the first part and the second part, and whose capacity lowering ratio is gradually changed from the capacity-lowering ratio of the first part to a capacity-lowering ratio of the second part.

2. The reproduction apparatus according to claim 1, characterized in that the other information is at least image information or video information.

3. The reproduction apparatus according to claim 1, characterized in that the capacity-lowering section detects at least one of a silent interval, an interlude interval, a prelude interval, and a voiceless interval, in the audio information read by the reading section, and lowers the capacity of only the part which corresponds to at least the one of the silent interval, the interlude interval, the prelude interval, and the voiceless interval.

4. The reproduction apparatus according to claim 1, characterized in that the capacity-lowering section changes the capacity-lowering ratio in accordance with a sound volume of the audio information read by the reading section.

5. The reproduction apparatus according to claim 1, characterized in that the capacity-lowering section changes the capacity-lowering ratio in accordance with at least either of a change in the sound pitch or a change in the sound loudness of the audio information read by the reading section.

6. The reproduction apparatus according to claim 1, characterized in that the capacity-lowering section changes the capacity-lowering ratio of the audio information read by the reading section, based on the storage capacity of the audio storing section.

7. The reproduction apparatus according to claim 1, characterized in that the recording medium, where the audio information and the other information are recorded, is a disk-shaped rotary recording medium.

8. The reproduction apparatus according to claim 7, characterized in that on the disk-shaped rotary recording medium, information is recorded using one of a magnetic phenomenon, an optical phenomenon, an electrical phenomenon, and a combination of some of these phenomena.

9. The reproduction apparatus according to claim 8, characterized in that the reading section includes a head, which executes a scan on the disk-shaped rotary recording medium and reads information recorded on the disk-shaped rotary recording medium using one of a magnetic phenomenon, an optical phenomenon, an electrical phenomenon, and a combination of some of these phenomena.

10. The reproduction apparatus according to claim 9, characterized in that the capacity-lowering section changes the capacity-lowering ratio of the audio information read by the reading section, based on the movement speed of the head.

11. The reproduction apparatus according to claim 10, characterized in that the capacity-lowering section changes the capacity-lowering ratio of the audio information read by the reading section, based on a movement speed of a head and a storage capacity of the audio storing section.

12. The reproduction apparatus according to claim 7, characterized in that the capacity-lowering section changes the capacity-lowering ratio of the audio information read by the reading section, based on the position on the recording medium where the audio information is recorded and the position on the recording medium where the other information is recorded.

13. A reproduction processing circuit which reproduces audio information and other information read from a recording medium where the audio information and the other information are recorded, the reproduction processing circuit comprising:

an information deciding section for deciding whether the information read from the recording medium is the audio information or the other information;

a capacity-lowering section for lowering a capacity of the audio information, by reducing a quantization bit number of the audio information when a tempo in the audio information is fast and by lowering a sampling frequency of the audio information when the tempo in the audio information is slow and storing the audio information having a lowered capacity in an audio storing section, if it is determined that the information read from the record medium is the audio information; and an expanding section for expanding the audio information stored in the audio storing section, wherein the audio information includes first audio information and second audio information, the second audio information being continuously reproduced after the first audio information; and the capacity-lowering section lowers the capacity of the first audio information expanded by the expanding section, such that a time for reproducing the first audio information is longer than a time required for reading the second audio information, and divides the first audio information read by a reading section into a first part whose capacity is lowered by a predetermined capacity-lowering ratio, a second part whose capacity is not lowered, and a third part corresponding to a predetermined interval between the first part and the second part, and whose capacity lowering ratio is gradually changed from the capacity-lowering ratio of the first part to a capacity-lowering ratio of the second part.

14. A reproduction method for reading and reproducing audio information and other information from a recording medium where the audio information and the other information are recorded, the reproduction method comprising:

reading, from the recording medium, the audio information;

lowering a capacity of the read audio information, by reducing a quantization bit number of the audio information when a tempo in the audio information is fast and by lowering a sampling frequency of the audio information when the tempo in the audio information is slow;

storing, in an audio storing section, the audio information having a lowered capacity;

reproducing the audio information stored in the audio storing section, reading, from the recording medium, the other information recorded in a different position from a position of the audio information;

storing, in an other information storing section, the read other information, and reproducing the other information stored in the other information storing , wherein the audio information includes first audio information and second audio information, the second audio information being continuously reproduced after the first audio information; and the capacity of the read first audio information is lowered, such that a time for reproducing the first audio information is longer than a time required for reading the second audio information, during a period of time when the other information is reproduced, and divides the first audio information read into a first part whose capacity is lowered by a predetermined capacity-lowering ratio, a second part whose capacity is not lowered, and a third part corresponding to a predetermined interval between the first part and the second part, and whose capacity lowering ratio is gradually changed from the capacity-lowering ratio of the first part to a capacity-lowering ratio of the second part.

15. A non-transitory computer-readable recording medium on which a reproduction program is recorded, the reproduction program for reading and reproducing audio information and other information from a recording medium where the audio information and the other information are recorded, the reproduction program comprising:

a reading section for reading, from the recording medium, the audio information and the other information, recorded in a different position from a position of the audio information;

a capacity-lowering section for lowering a capacity of the audio information read by the reading section, by reducing a quantization bit number of the audio information when a tempo in the audio information is fast and by lowering a sampling frequency of the audio information when the tempo in the audio information is slow;

an audio storing section for storing the audio information having a lowered capacity;

an audio reproducing section for reproducing the audio information stored in the audio storing section, an other information storing section for storing the other information read by the reading section, and an other information reproducing section for reproducing the other information stored in the other information storing section, wherein the audio information includes first audio information and second audio information, the second audio information being continuously reproduced after the first audio information, and the capacity-lowering section lowers the capacity of the first audio information read by the reading section, such that a time for reproducing the first audio information is longer than a time required for reading the second audio information, during a period of time when the other information is reproduced by the other information reproducing section, and divides the first audio information read by a reading section into a first part whose capacity is lowered by a predetermined capacity-lowering ratio, a second part whose capacity is not lowered, and a third part corresponding to a predetermined interval between the first part and the second part, and whose capacity lowering ratio is gradually changed from the capacity-lowering ratio of the first part to a capacity-lowering ratio of the second part.

\* \* \* \* \*